July 23, 1974     A. B. M. FAYET     3,825,645

EXTRUSION METHOD AND APPARATUS

Filed May 10, 1972     2 Sheets-Sheet 1

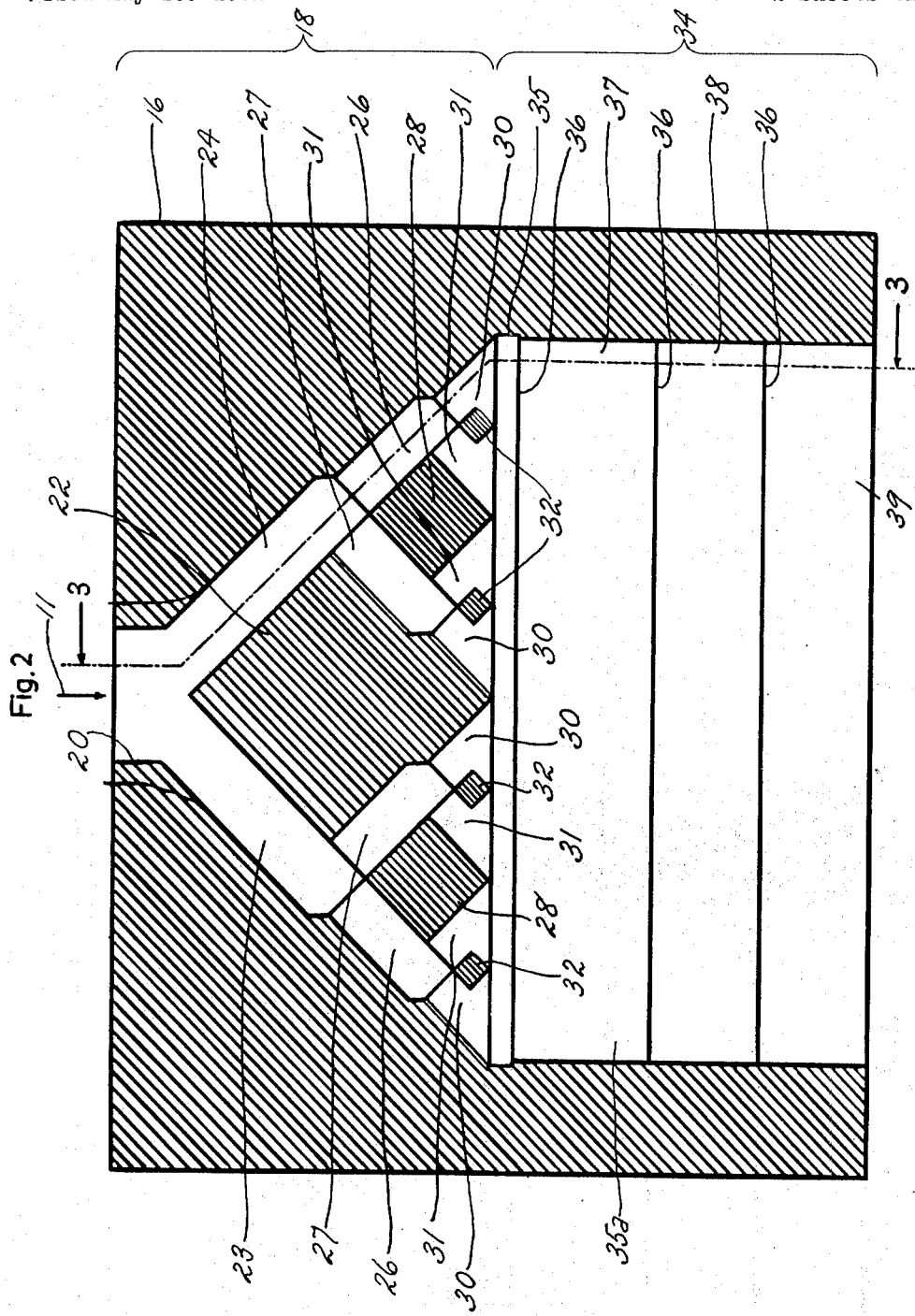

United States Patent Office
3,825,645
Patented July 23, 1974

3,825,645
EXTRUSION METHOD AND APPARATUS
Andre Barthelemy Marie Fayet, Puy de Dome, France, assignor to Tri-Cology, Inc., Manhasset, N.Y.
Filed May 10, 1972, Ser. No. 251,972
Claims priority, application France, May 10, 1971, 7116828
Int. Cl. B29f 3/00
U.S. Cl. 264—177     10 Claims

ABSTRACT OF THE DISCLOSURE

A method and apparatus for extruding thermoplastic material containing a substantial quantity of an inert substance. The material is directed through a multiplicity of diagonal channels in an extrusion head in accordance with a triangular distribution such that each particle of material travels a uniform distance in a uniform length of time. The forces acting on each particle at a given distance along its flow path are the same, and the material is subjected to compression as it moves through the head with the result that there is provided an extremely even distribution of the inert substance within the finished product.

BACKGROUND OF THE INVENTION

This invention relates to the extrusion of thermoplastic materials and more particularly to the extrusion of such materials which contain a substantial loading of one or more inert substances.

The extrusion of comparatively pure thermoplastic materials to form particular shapes, such as sheets, rods, tubes, etc., is well known, and fabrication is effectively accomplished by various known techniques. However, this is not the case for producing thermoplastic extrusions from material containing more than a small amount of an inert substance. Conventional techniques have proved deficient in many respects for extruding this latter type of material, and while some of the deficiences were independent of the shape of the extruded piece, particular problems have been encountered in cases in which the extrusion is planar, corrugated or otherwise of substantially flat configuration.

Typical forms of sheeting obtained from extrusion processes include thermoplastic film, thin sheets having a thickness in the range of from 0.10 to 0.30 millimeters, and thick sheets in excess of 0.30 millimeters in thickness. Each of these types may be produced from relatively pure thermoplastic material which is dircted through flat extrusion heads. In addition, thermoplastic film and thin sheets may be manufactured by advancing the pure material through an annular extrusion head which for thin sheets is equipped with a knife that slices the tubular material emerging from the head. The sheets are then subjected to a smoothing operation through the use of calender rolls or similar equipment.

Presently available techniques which utilize annular extrusion heads for the most part are not practicable for products containing a high percentage of inert granular or fibrous material. Following the extrusion of the material it undergoes suitable calendering and cooling, and the resulting distension of the sheet, coupled with the adverse effect of the inscriber used in the slicing, produces an uneven distribution of the inert ingredients, internal stresses, etc. As a result, the finished product exhibits a lack of internal stability and other undesirable properties which render it unsuitable for many applications.

Attempts to utilize flat extrusion heads in the production of thermoplastic sheeting containing substantial inert material similarly have resulted heretofore in only limited success. The material customarily was led to the extrusion head in circular form, and its transformation into a flat sheet resulted in pressures which were greater at the center of the sheet than at the edges. Moreover, in many cases the pressures acting on one edge of the sheet were greater than on the opposite edge because of the rotation of the extrusion vise. The uneven pressures created internal stresses and other defects in the finished product which seriously impaired its overall utility.

In an effort to overcome the problems incident to the use of flat extrusion heads, extruders of the so-called "coat hanger" and "fish-tail" types have been developed. These extruders are generally of flattened, funnel-shaped configuration and include one or more diversion barriers in an attempt to regulate the thermoplastic flow and to channel any preferred flow. Such extruders have proven less than satisfactory in practice, however, and are comparatively expensive and highly sensitive. Moreover, their utility decreases substantially as the perecntage of inert material within the thermoplastic increases.

SUMMARY

One general object of this invention, therefore, is to provide a new and improved method and apparatus for extruding thermoplastic material.

More specifically, it is an object of this invention to provide such method and apparatus having the capability of extruding thermoplastic material which contains a substantial quantity of an inert substance.

Another object of this invention is to provide a method and apparatus of the character indicated in which the inert substance is uniformly distributed within a substantially flat extruded sheet.

A further object of this invention is to provide a system for extruding thermoplastic material which is economical and thoroughly reliable in operation.

The present invention utilizes the principle that a pasty thermoplastic mass to be controlled and guided in the exrusion process does not have fixed or stable properties but instead exhibits variable fluidity and dimensional characteristics in accordance with the changes in temperature as the material passes through the extrusion head. The mass enters the head at a controlled temperature and is discharged at an equally controlled temperature, normally lower than the entrance temperature. If the temperature of a particular particle of material at a given distance along its flow path is not the same as the temperature of every other particle at that distance, internal stresses are set up in the finished sheet which seriously impair its utility.

Based on these principles, the method of the present invention is characterized by the division of flow of the plastic material in a regular and successive manner such that each particle of material travels an equal distance in the same time span as every other particle. For a given distance of travel, all of the particles are subjected to the same force and are at the same temperature. The resulting sheet exhibits extremely uniform characteristics with little or no internal stress even in cases in which the thermoplastic material contains a substantial quantity of an inert substance.

The present invention additionally includes a novel extrusion head characterized by a multi-channel design which enables the division of the material entering the head into two streams, each of which is in turn divided into two further streams, and the further streams may be similarly divided to the extent necessary to provide the desired width for the finished sheet.

The present invention, as well as further objects and features thereof, will be understood more clearly and fully from the following description of certain preferred embodiments, when read with reference to the accompanying drawings.

BRIEF DESCRIPTION OF THE DRAWINGS

FIG. 2 is a median sectional view of an extrusion head in accordance with one illustrative embodiment of the invention which is useful in practicing the method of the invention.

DESCRIPTION OF CERTAIN PREFERRED EMBODIMENTS

Figure 1:
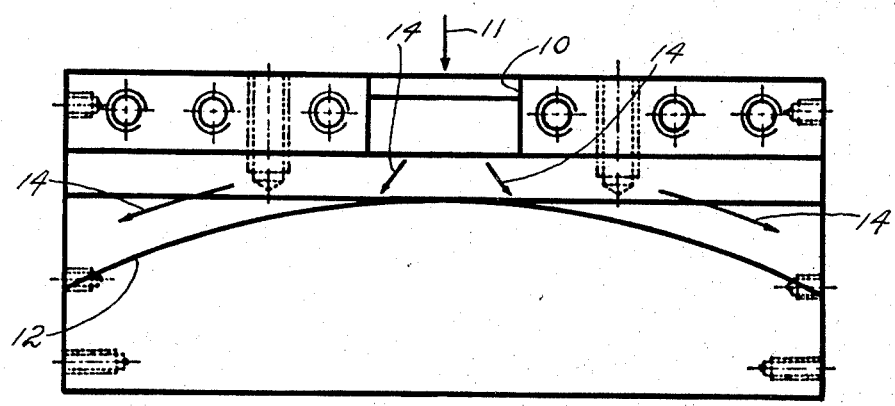
FIG. 1 is a plan view of a prior art extrusion head of the "coat hanger" type.

FIG. 1 is illustrative of a portion of a conventional extrusion head of the "coat hanger" type for producing substantially flat sheets of thermoplastic material. The extrusion head includes an entrance channel 10 which is supplied with the material in heated, comparatively fluid form from the usual melting pot or other suitable source represented by the arrow 11. The head is maintained at an elevated temperature and is provided with an internal barrier 12 which serves to direct and spread the material toward the extruder mouth as indicated by the arrows 14.

It will be apparent from an examination of FIG. 1 that the flowing mass of thermoplastic material must travel different distances through the extrusion head and hence is exposed to different temperature conditions. The material undergoes different rates of flow within the flowing mass, and an undesirable layering effect takes place. As the mass passes through the head, portions of the material become cooled at a more rapid rate than other portions, and internal stresses are formed in the finished sheet. In cases in which the material contains a substantial loading of glass particles or other inert substance, the substance is unevenly distributed within the sheet and exhibits a tendency to augment the undesirable stress concentrations.

In the various embodiments of the invention illustrated in FIGS. 2–5, these and other difficulties are overcome by dividing the flow of thermoplastic material into two equal streams, thereafter dividing the streams in turn into additional streams, and repeating the stream division process as many times as is needed in order to achieve the desired width for the finished sheet. Each particle of material within the flowing mass travels through the extrusion head an equal distance in the same time span as every other particle, and for a given distance of travel all of the particles are subjected to the same force and are at the same temperature. The arrangement is such that little or no internal stresses are created in the finished sheet irrespective of the degree of loading, and the sheet exhibits extremely uniform characteristics.

Figure 3:
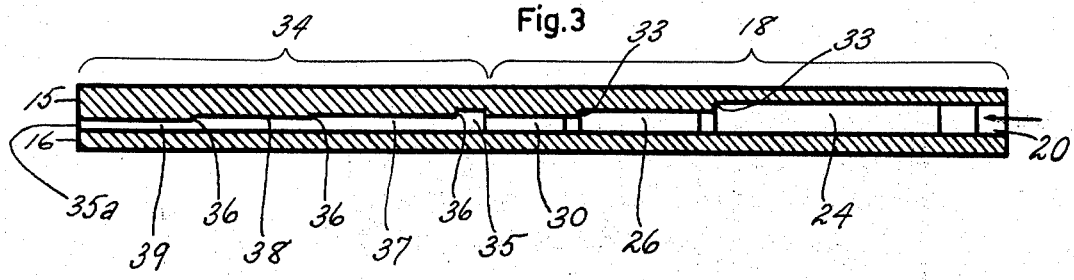
FIG. 3 is a sectional view taken generally along the line 3—3 in FIG. 2.

Referring to the embodiment illustrated in FIGS. 2 and 3, there is shown an extrusion head which includes a pair of generally flat plates 15 and 16. These plates are maintained at a uniform elevated temperature and are positioned one above the other with appropriate recesses in the plate 15 to form a triangulated labyrinth of generally flat flow channels in the infeed portion 18 of the head. Thus, the infeed portion 18 defines an entrance channel 20 of rectangular cross-section adjacent the upper edge of the head, as viewed in FIG. 2, and a substantially square separating member 22, which may be integral with the head, divides the entrance channel into a pair of additional channels 23 and 24. Each of the channels 23 and 24 is of rectangular cross-section and meets the channel 20 at a forty-five degree angle. The channels 23 and 24 are of equal cross-sectional area, and their aggregate cross-sectional area is slightly less than that of the entrance channel, for purposes that will become more fully apparent hereinafter.

In a similar manner, each of the additional channels 23 and 24 is divided into two further channels 26 and 27 by a substantially square separating member 28. In accordance with the triangulated channel pattern, the channels 26 are in line with their corresponding feed channels 23 and 24, while the channels 27 meet their associated feed channels at a ninety degree angle. With this arrangement, the channels 26 and 27 are each oriented at an angle of forty-five degrees with respect to the direction of flow of the material entering the infeed channel 20. The cross-sectional area of each of the channels 26 and 27 is the same, and the aggregate cross-sectional area of the channels 26 and 27 in each pair is slightly less than that of their feed channel.

Each of the channels 26 and 27 in turn is divided into still further channels 30 and 31 by substantially square separating members 32. These latter channels are arranged in a manner similar to the channels 26 and 27 and likewise are oriented at a forty-five degree angle with respect to the entrance channel 20. As in the case of the previous pairs of channels, the channels 30 and 31 in each pair are of equal cross-sectional area and have an aggregate cross-sectional area which is slightly less than the immediately preceding channel. The plate 15 is provided with internal steps 33 (FIG. 3) such that the thickness of the channels 30 and 31 is less than the thickness of the channels 26 and 27 and the thickness of these latter channels in turn is less than that of the channels 23 and 24, for purposes which will become more fully apparent hereinafter. The channels 30 and 31 are in open communication with the discharge portion 34 of the extrusion head at spaced locations therein.

The discharge portion 34 is substantially flat and unobstructed and includes a transverse entry channel 35 of rectangular cross-section. The channel 35 extends across the extrusion head in communication with each of the channels 30 and 31 in the infeed portion 18. As best shown in FIG. 3, the thickness of the channel 35 is greater than that of channels 30 and 31. Each pair of channels 30 and 31 forms an isosceles triangle with the channel 35, the channels 30 and 31 meeting the channel 35 at forty-five degree angles and being flared at their downstream ends to provide the desired spacing between the channels.

The remainder of the discharge portion 34 comprises a single, substantially flat channel 35a of progressively decreasing cross-sectional area. The plate 15 includes internal steps 36 which divide the channel 35a into successive sections 37, 38 and 39. As a result of these steps, each of the sections 37, 38 and 39 has a thickness and hence a cross-sectional area which is less than that of the preceding section. The thickness of the sections 37 is equal to the thickness of the channels 30 and 31 and less than the thickness of the discharge entry channel 35, and the thickness of the section 38 is less than that of the section 37. The thickness of the outfeed section 39 is slightly less than the thickness of the channels 30 and 31 in the infeed portion 18.

Heated thermoplastic material containing a substantial loading of an inert substance enters the extrusion head through the entrance channel 20. As will be understood, the plates 15 and 16 which form the extrusion head similarly are heated to maintain the material in a softened condition. The incoming material is divided into two streams of equal thickness and cross-sectional area by the channels 23 and 24 as the material moves along its flow path. The material in each of these channels in turn is divided into two additional streams of equal thickness and cross-sectional area as it proceeds along the flow path into the channels 26 and 27, and each of these latter streams is divided into two further streams of equal thickness and cross-sectional area within the channels 30 and 31. The material is fed from the channels 30 and 31 into the transverse channel 35 in such a way that at the base of the triangulation of streams the different streams are sufficiently close to one another that they regroup and form what in effect is a single continuous line of extruded material. The material flows as a continuous layer through the successive sections 37, 38 and 39 in the discharge portion 34 and is discharged from the extrusion head in a substantially flat sheet.

As indicated heretofore, the aggregate thickness and cross-sectional area of each pair of separating channels 23 and 24, 26 and 27, and 30 and 31, is less than the thickness and cross-sectional area of the immediately preceding channel. Similarly, the cross-sectional area of the discharge sections 37, 38 and 39 decreases as a result of the steps 36. With this arrangement, the material flowing through the extrusion head is subjected to progressive increases in compression and progressive release of temperature to insure an extremely equal distribution of the driving forces acting on the material. As each particle of material moves through the head, it is subjected to forces which are uniform at a given distance from the entrance channel 20 irrespective of the particular path taken by the particle, and this uniformity of force is maintained as the particles reach the discharge portion 34.

It will be apparent that as any given particle of thermoplastic material advances through the extrusion head the distance traveled and the time consumed by the particle is the same. The particles at any given distance from the entrance channel 20 are at a uniform temperature, with the result that there is provided a constant and effective thermal equilibrium irrespective of the width of the thermoplastic sheet being produced. The thermal equilibrium is unaffected by the degree of inert loading of the material, with the result that internal stresses in the finished sheet are maintained at a minimum.

Figure 4:
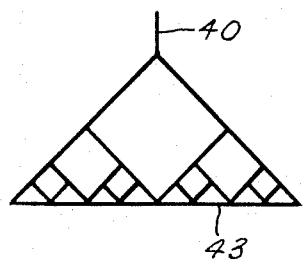
FIG. 4 is a schematic representation of an extrusion head in accordance with another illustrative embodiment of the invention.
Figure 5:
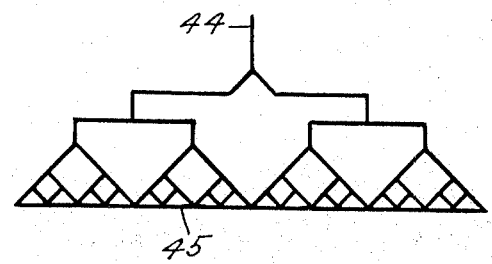
FIG. 5 is a schematic representation of an extrusion head in accordance with still another illustrative embodiment of the invention.

FIGS. 4 and 5 are schematic illustrations of the arrangement of channels in the infeed portions of extrusion heads to provide thermoplastic sheets of different widths. In FIG. 4, for example, a stream of heated thermoplastic material is admitted to the head through an entrance channel 40 and the stream undergoes four successive divisions prior to reaching a transverse channel 43 in the discharge portion of the head. In FIG. 5 there are five such divisions between an entrance channel 44 and a transverse discharge channel 45. In each case the distance from the entrane channel to the transverse channel is the same irrespective of the particular path taken by the material. For even wider sheets the illustrated arrangements may be doubled, etc., to provide the desired sheet width.

EXAMPLE 1

As an illustrative example of an extrusion process in accordance with the invention, polypropylene thermoplastic material, available commercially from Societe Normande de Matiere Plastique under its trade name "Prylene PL 0651," was formed into extruded sheets through the use of an extrusion head of the type illustrated in FIGS. 2 and 3. The head included two superimposed plates 15 and 16, each measuring 30.0 centimeters by 34.0 centimeters by 6.0 centimeters thick, which were maintained at an elevated temperature by conventional cartridge resistance heating elements. The polypropylene material contained an inert substance in the form of fine screened glass powder in the ratio of 100 parts by weight of polypropylene to 200 parts by weight of glass. The mixture was heated to a temperature sufficient to provide the usual fluidity for extruding polypropylene and was directed under pressure into the entrance channel 20 of the extrusion head to form a stream having a rectangular cross-section which measured 50.0 millimeters by 12.0 millimeters. As the material passed through the infeed portion 18 of the head, it was successively divided into further streams in accordance with the triangulated pattern illustrated by the various channels in FIG. 2. The material then proceeded through the discharge portion 34 of the head and emerged in a single flat sheet having a width of 30.0 centimeters and a thickness of 0.3 centimeters. The sheet was calendered and cooled in accordance with conventional extrusion practice to produce, after cutting, writing slates which exhibited extremely good internal stability without evidence of internal stress.

EXAMPLE 2

In another illustrative example according to the invention, a mixture of sawdust and tar was substituted for the glass powder in the foregoing example, and the process was repeated. The resulting thermoplastic sheet exhibited no evidence of internal stress or uneven distribution of the inert mixture.

EXAMPLE 3

In still another illustrative example in accordance with the invention, the procedure of Example 1 was repeated, but with Prylene PL 0651 polypropylene material containing ninety percent by weight of fine screened glass powder. As in the previous examples, no evidence of internal stress or uneven distribution of the powder was observed in the finished sheet.

In addition to the production of writing slates, numerous other products may be readily manufactured with the method and apparatus of the invention. Illustrative products of particular utility include blackboards, building surface materials, floor and wall coverings, etc., of polypropylene, polyethylene, polyvinyl and other thermoplastic materials. In addition, the type and amount of inert substance in the thermoplastic material may be varied to produce a variety of new products having particular properties, or simply to achieve cost reduction, disposal of industrial waste and other advantages in the manufacture of existing products.

The terms and expressions which have been employed are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. A method for extruding thermoplastic material comprising, in combination:

introducing an inert substance into the thermoplastic material to provide a substantial loading of said substance in said material;

advancing a stream of the thus loaded thermoplastic material in softened condition along a multi-channel flow path having an infeed portion and a discharge portion;

separating the thermoplastic stream into two additional streams of rectangular cross-section and of equal cross-sectional area as the material moves along the flow path;

separatng each of the additional streams into two further streams of rectangular cross-section and of equal cross-sectional area as the material continues its movement along the flow path;

compressing the material moving along the flow path by maintaining the thickness and aggregate cross-sectional area of each pair of the separated streams less than the respective thickness and cross-sectional area of the stream prior to the separation;

directing the further streams into the discharge portion of the flow path with said further streams in spaced relationship with one another; and maintaining equal the time consumed by each particle of material as the material is advanced from the infeed portion to the discharge portion.

2. A method of the character set forth in claim 1, in which the further streams are arranged in a triangular pattern within the extrusion head.

3. A method for extruding thermoplastic material comprising, in combination:
   introducing an inert substance into the thermoplastic material to provide a substantial loading of said substance in said material;
   advancing a stream of the thus loaded thermoplastic material in softened condition through an extrusion head having a substantially flat infeed portion and a substantially flat discharge portion;
   separating the thermoplastic stream into two additional streams of rectangular cross-section and of equal thickness and cross-sectional area within the extrusion head;
   separating each of the additional streams into two further streams of rectangular cross-section and of equal thickness and cross-sectional area within the extrusion head;
   compressing the material moving along the flow path by maintaining the thickness and aggregate cross-sectional area of each pair of the separated streams less than the respective thickness and cross-sectional area of the stream prior to the separation;
   directing the further streams into the discharge portion of the extrusion head with said further streams in spaced relationship with one another but in sufficient proximity to form a continuous layer of material in said discharge portion;
   maintaining equal the distance travelled and the time consumed by each particle of material as the material is advanced from the infeed portion to the discharge portion; and
   exerting a uniform force on each of the particles of material as the particles reach the discharge portion.

4. A method for extruding thermoplastic material comprising, in combination:
   introducing an inert substance into the thermoplastic material to provide a substantial loading of said substance in said material;
   advancing a stream of the thus loaded thermoplastic material in softened condition along a flow path having a labyrinth infeed portion and a substantially flat unobstructed discharge portion;
   separating the thermoplastic stream into two additional streams of rectangular cross-section and of equal cross-sectional area as the material moves along the infeed portion;
   separating each of the additional streams into two further streams of rectangular cross-section and of equal cross-sectional area as the material continues its movement along the infeed portion; the further streams being arranged in a triangular pattern with said discharge portion;
   compressing the material moving along the infeed portion by maintaining the aggregate cross-sectional area of each pair of separated streams less than the cross-sectional area of the stream prior to the separation;
   directing the further streams into said unobstructed discharge portion with said further streams in spaced relationship with one another but in sufficient proximity to form a continuous layer of material in said discharge portion;
   maintaining equal the distance travelled and the time consumed by each particle of material as the material is advanced from the infeed portion to the discharge portion; and
   exerting a uniform force on each of the particles of material as the particles reach the discharge portion.

5. A method of the character set forth in claim 4, in which the triangular pattern of the further streams approximates a plurality of isosceles triangles.

6. Apparatus for extruding thermoplastic material comprising, in combination:
   an extrusion head having an infeed portion and a discharge portion, said discharge portion defining a single flat channel of substantially rectangular cross-section having progressive reductions in thickness and having an exit thickness in excess of 0.30 millimeters;
   means defining a flow channel within the infeed portion of the extrusion head;
   first separating means within the infeed portion of the extrusion head for defining a pair of additional channels in communication with the flow channel, the thickness and aggregate cross-sectional area of the additional channels being less than the respective thickness and cross-sectional area of the flow channel;
   additional separating means within the infeed portion of the extrusion head for defining at least two pairs of further channels, each pair of further channels communicating with one of said additional channels and having a thickness and aggregate cross-sectional area which is less than the respective thickness and cross-sectional area of the corresponding additional channel, said further channels being in communication with the single flat channel in the discharge portion of the extrusion head at spaced locations therein; and
   means for advancing thermoplastic material in softened condition through said flow channel, said additional channels and said further channels to said discharge portion, each particle of material travelling an equal distance as it is advanced from the flow channel to the discharge portion.

7. Apparatus of the character set forth in claim 6, in which the further channels are arranged in accordance with a triangular labyrinth within the infeed portion of the extrusion head.

8. Apparatus of the character set forth in claim 6, in which the triangular labyrinth forms a plurality of substantially isosceles triangles with the discharge portion of the extrusion head.

9. Apparatus for extruding thermoplastic material comprising, in combination:
   an extrusion head having a substantially flat infeed portion and a substantially flat discharge portion having an exit thickness in excess of 0.30 millimeters;
   means defining a flow channel within the infeed portion of the extrusion head;
   first separating means within the infeed portion of the extrusion head for defining a pair of additional channels of substantially rectangular cross-section and of equal thickness and cross-sectional area in communication with the flow channel, the thickness and aggregate cross-sectional area of the additional channels being less than the respective thickness and cross-sectional area of the flow channel;
   additional separating means within the infeed portion of the extrusion head for defining a triangulated path including at least two pairs of further channels of substantially rectangular cross-section and of equal thickness and cross-sectional area, each pair of further channels communicating with one of said additional channels and having a thickness and aggregate cross-sectional area which is less than the respective thickness and cross-sectional area of the corresponding additional channel, said further channels being in open communication with the discharge portion of the extrusion head at spaced locations therein; and
   means for advancing thermoplastic material in softened condition through said flow channel, said additional channels and said further channels to said discharge portion, each particle of material travelling an equal distance in the same amount of time as it is advanced from the flow channel to the discharge portion, said spaced locations being in sufficient proximity with one another to form a continuous layer of material in said discharge portion.

10. Apparatus of the character set forth in claim 9, in which the discharge portion of the extrusion head defines a substantially flat channel having successive reductions in thickness.

References Cited
UNITED STATES PATENTS

| | | | |
|---|---|---|---|
| 2,930,083 | 3/1960 | Vostovich et al. | 264—174 |
| 2,696,640 | 12/1954 | Wienand | 264—171 |
| 2,734,224 | 2/1956 | Winstead | 425—461 |
| 3,308,222 | 3/1967 | Kovacs | 264—176 R |
| 3,381,336 | 5/1968 | Wells | 425—378 |

OTHER REFERENCES

Fisher: "Extrusion of Plastics," 1964, pp. 181–183.

ROBERT F. WHITE, Primary Examiner

T. E. BALHOFF, Assistant Examiner

U.S. Cl. X.R.

264—349; 425—376, 461